United States Patent Office 3,360,841
Patented Jan. 2, 1968

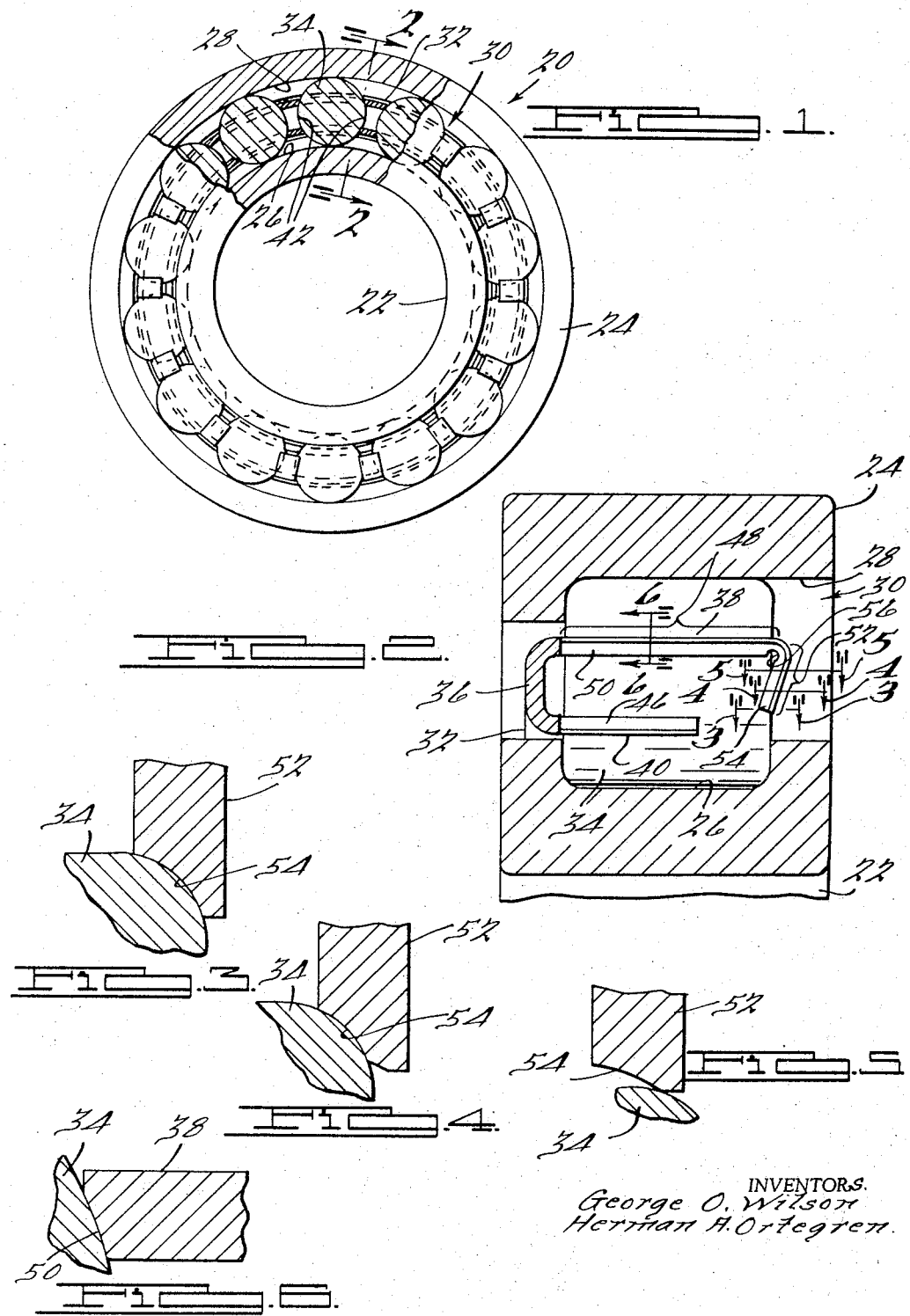

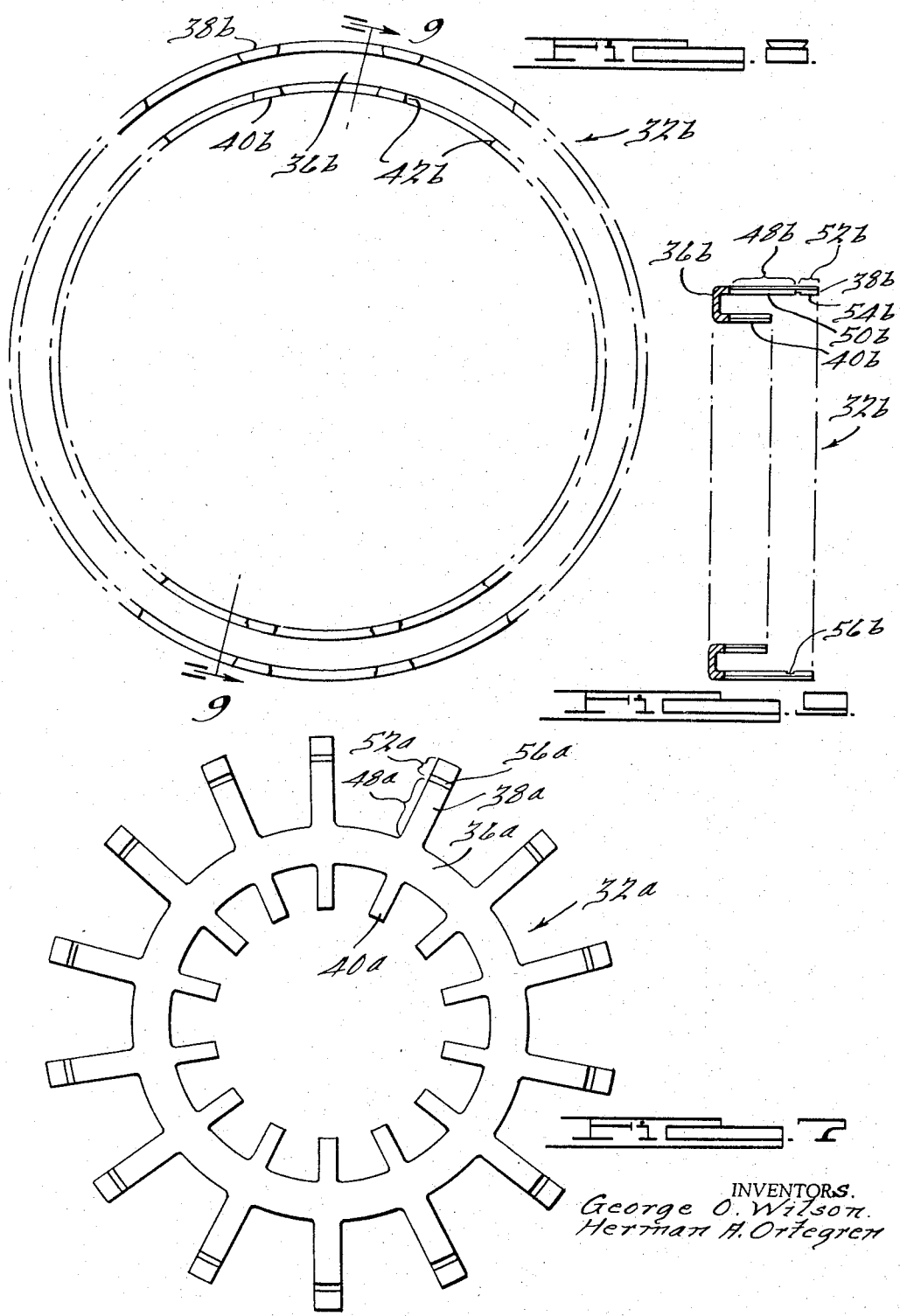

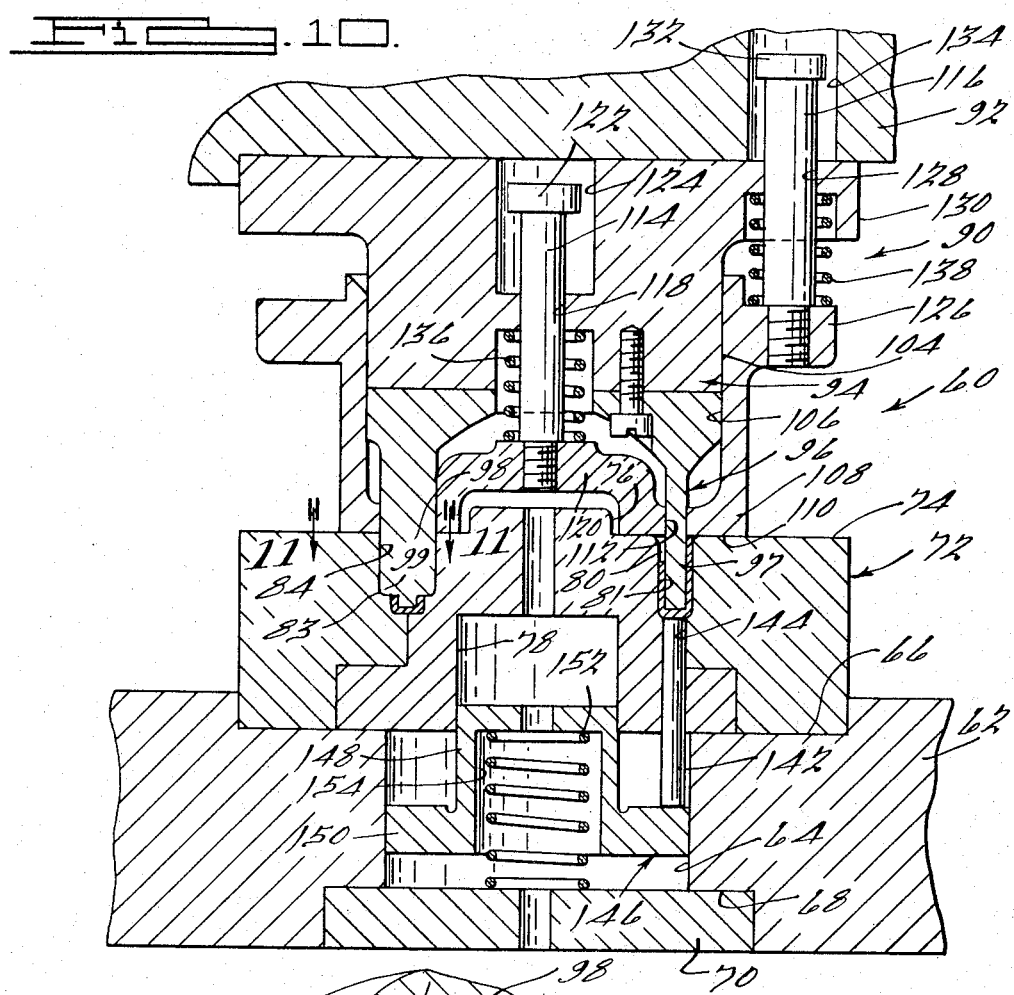

3,360,841
METHOD OF MAKING A BEARING ASSEMBLY
George O. Wilson, Grosse Pointe Shores, and Herman A. Ortegren, Grosse Pointe, Mich., assignors to Federal-Mogul Corporation, a corporation of Michigan
Original application May 18, 1964, Ser. No. 368,070, now Patent No. 3,301,616, dated Jan. 31, 1967. Divided and this application Oct. 25, 1966, Ser. No. 595,556
7 Claims. (Cl. 29—148.4)

ABSTRACT OF THE DISCLOSURE

A method of making a bearing retainer and a bearing assembly by forming the retainer from a flat blank.

---

This application is a division of our copending United States patent application Ser. No. 368,070, filed May 18, 1964, now Patent No. 3,301,616, granted Jan. 31, 1967.

This invention relates to the method for making antifriction bearing retainers, and more particularly to retainers for roller bearings.

The present invention provides a retainer which is of a novel construction for retaining a plurality of roller members and which is of a one-piece construction which can be conveniently formed from a flat sheet metal blank by a simple and direct method. It is an object of this invention, then, to provide a novel, simple method for making a roller bearing cage which is of a relatively inexpensive construction. In the roller bearing cage of the present invention, the rollers are retained by and are engageable with edge surface areas having a curved contour which is similar to that of the rollers, thus providing substantial bearing surfaces and thus eliminating line or point contact. Therefore, it is another object of this invention to provide a method for making a roller bearing retainer in which the rollers are retained by surface areas having contours similar to the mating surface areas of the rollers.

It is still another object of this invention to provide a novel method for making a roller bearing cage or retainer.

Other objects, features and advantages of the present invention will become apparent from the subsequent description and the appended claims, taken in conjunction with the accompanying drawings, in which:

FIGURE 1 is a side elevational view, with some parts broken away and others shown in section, of a roller bearing assembly, including inner and outer races, roller bearings, and a cage embodying a preferred form of the present invention;

FIGURE 2 is a sectional view, to increased scale, of the bearing assembly of FIGURE 1, taken substantially along the line 2—2;

FIGURE 3 is a sectional view, to increased scale, of a portion of the view of FIGURE 2, taken substantially along the line 3—3;

FIGURE 4 is a sectional view, to increased scale, of a portion of the view of FIGURE 2 taken substantially along the line 4—4;

FIGURE 5 is a sectional view, to increased scale, of a portion of the view of FIGURE 2, taken substantially along the line 5—5;

FIGURE 6 is a sectional view, to increased scale, of a portion of the view of FIGURE 2 taken substantially along the line 6—6;

FIGURE 7 is a side elevational view of a blank from which the cage of the bearing assembly of FIGURE 1 is formed and depicts one step in the method of making that cage;

FIGURE 8 is a side elevation view, at increased scale, of the blank of FIGURE 7 after the next step of the method of making the cage of the bearing assembly of FIGURE 1;

FIGURE 9 is a sectional view, at reduced scale, of the formed blank of FIGURE 8 taken substantially along the line 9—9;

FIGURE 10 is a side elevational, sectional view of apparatus for forming the formed blank of FIGURE 8 from the blank of FIGURE 7; and FIGURE 11 is a sectional view, at increased scale, of the apparatus of FIGURE 10, taken substantially along the line 11—11.

Looking now to FIGURE 1, a bearing assembly 20 includes inner and outer race members 22 and 24, respectively, having raceways 26 and 28 in which is located a roller bearing and retainer assembly 30. The latter assembly includes a bearing cage or retainer 32 which retains a plurality of rollers 34. Each of the rollers 34 is generally cylindrical with its ends rounded to a generally spherical contour.

The cage 32 has an annular ring portion 36 which has a U-shaped radial cross-section which opens axially to one side. A plurality of circumferentially spaced legs 38 extend substantially axially, parallelly to the axis of the ring portion 36, from the radially outer rim of the ring portion 36. Each of the outer legs 38 includes a main leg portion 48 which extends axially, substantially coextensively with the length of the roller member 34 and which terminates in a radially inwardly bent end portion 52. A like plurality of circumferentially spaced legs 40 extend substantially axially from the radially inner rim of the ring portion 36 and define with the legs 38 a plurality of circumferentially spaced pockets 42 for receiving the rollers 34. These pockets 42 are defined by the confronting edge or side surfaces 50 of main leg portion 48 and confronting edge or side surfaces 54 of bent end portion 52 of adjacent ones of outer legs 38 and of confronting edge or side surfaces 46 of adjacent ones of inner legs 40. The edge surface 46, the edge surface 50, and the edge surface 54, prior to end portion 52 being pent, have a curved contour defining a portion of a right circular cylinder of a diameter substantially equal to the diameter of the rollers 34. The outer legs 38 and inner legs 40 are spaced from each other such that the confronting curved edge surfaces 50 and confronting edge surfaces 46 generally provide bearing seats or surfaces which define the contour of a right circular cylinder of a diameter substantially equal to the diameter of the rollers 34, whereby the rollers 34 can be matably supported (see FIGURE 6). The opposite ends of each roller 34 are rounded whereby a portion of a sphere is defined. The axially innermost extremities of the curved edge surfaces 46 and 50 terminate in a similar contour to matably receive the corresponding end of the associated roller. Note that the edge surfaces 46 and 50, in defining seats for the rollers 34, extend for a substantial extent of the thickness of corresponding legs 40 and 38. Thus, the bearing seats provide good mating bearing surfaces for each of the rollers 34 with line or point contact being eliminated. In order to retain the rollers 34 within the pockets 42, each end portion 52 is bent radially inwardly against the ends of the rollers 34 and swaged to form on its edge surface 54 the generally spherical contour of the ends of the rollers 34 (see FIGURES 3 through 5). Again, a good mating, bearing surface is provided for the rollers 34 by the generally spherically contoured surface formed in the edge surface 54 of the end portion 52 with line or point contact being substantially eliminated. As can be seen from the drawings, the outer legs 38 are longer than the inner legs 40 to provide for the extra length utilized in bending. In order to facilitate bending and in order to assure that bending will occur at the proper location each time, the end portion 52 is separated from the main axially extending leg portion 48 by means of a notch 56 which provided a weakened section in the plane of the bending of the end portion 52. This weakened section 56 provides an additional function since it permits the end portion 52 to bend more readily at the point of the notch 56 and hence prevents any tendency for the main leg portion 48 to be bowed or deformed radially outwardly into a position away from the surface of the roller 34 as the end portion 52 is bent radially inwardly. Thus the roller bearing and retainer assembly 30 can be handled and the rollers 34 are held from falling out via the end portions 52 and hence the roller bearing and retainer assembly 30 can be assembled to a pair of races such as races 22 and 24. Note that each of the leg portions 38 and 40 extend axially outwardly, generally straightly and that each has a generally uniform cross-section over its length taken in a direction transversely to its thickness.

The cage 32 can be made from flat sheet metal stock. In the following discussion of the method of making and assembling the roller bearings and retainer assembly 30, components or portions evolving into the components or portions described in the embodiments of FIGURES 1 through 6 are given the same number with the addition of a letter subscript.

In the first step in forming the cage 32, a piece of flat sheet metal is stamped or otherwise formed into a flat blank 32a as shown in FIGURE 7. The blank 32a has a flat annular ring portion 36a having a plurality of circumferentially spaced flat leg portions 38a extending radially outwardly therefrom. A like plurality of flat leg portions 40a extend radially inwardly from the ring portion 36a with each located oppositely from one of the outer leg portions 38a. Each of the leg portions 38a and 40a has a generally uniform cross-section over its length taken in a direction transversely to its thickness. The outer leg portions 38a are made longer than the inner leg portions 40a, for a purpose to be seen. Simultaneously, in the forming of the flat blank 32a, a notch or depression 56a is formed across the width of each of the outer leg portions 38a near the end thereof whereby the outer leg portions 38a can be considered to be divided into a main leg portion 48a and an end portion 52a.

In the next step the blank 32a is formed into the shape of member 32b (FIGURE 8) with the ring portion 36a being deformed into ring portion 36b (FIGURE 9) having a U-shaped radial cross-section and with the legs 38a and 40a moving to positions in which they extend axially and parallelly relative to a central axis of the ring portion 36b. At the same time the legs 38a and 40a are swaged to form legs 38b and 40b with edge surfaces having an arcuate contour similar to the contour of the rollers 34 whereby the rollers can be matably held. Thus each of the legs 38b has edge surfaces 50b and 54b for the main leg portion 48b and end portion 52b, respectively, and each of the legs 40b has its edge surface 46b having a curved contour defining portions of a right circular cylinder having a diameter substantially equal to the diameter of the rollers 34.

The operation of the previous step can be performed in a die assembly 60 shown in FIGURE 10. A stationary base member 62 has a through bore 64 having counterbores 66 and 68 at its upper and lower ends, respectively. A cap 70 is located in lower counterbore 68 and a female die assembly 72 is located in the upper counterbore 66. The female die assembly 72 has a substantially flat upper surface 74 with a piloting boss 76 extending upwardly therefrom and has a bore 78 in its rearward end which is located coaxially relative to bore 64 in the base 62. A die cavity 80 has a ring-shaped cavity portion 81 extending axially inwardly from the upper surface 74 and generally defining a rectangular cross-section taken radially. The die cavity 80 has a plurality of inwardly extending bores 84 having their axes located upon a circle extending centrally about the ring portion 81. The bores 84 extend for only a portion of the depths of ring portion 81 and generally define a right circular cylinder. The innermost ends 83 of the bores 84 are generally of a spherical contour whereby the bores 84 substantially define a contour corresponding substantially to that of the rollers 34. The cavity 80 is of a diametrical size corresponding to that of the retainer 32 and the bores 84 are circumferentially spaced identically to the spacing of the pockets 42.

The die assembly 60 has a movable upper die assembly 90 which is movable relative to the fixed base 62 and hence relative to the fixed female die assembly 72. The upper die assembly 90 includes a movable press member 92 having a male die assembly 94 fixed thereto. The male die assembly 94 terminates at its lower end in a generally annular male die 96 which has a ring-shaped portion 97 having a shape substantially similar to that of the ring-shaped cavity portion 81 of the female cavity 80 but is generally slightly smaller by a dimension corresponding to the thickness of the metal of the blank such as blank 32a. The male die 96 has a plurality of cylinder portions 98 of a shape substantially identical with that of the bores 84 and each of which includes a spherical portion 99 corresponding to the spherically contoured end 83 and each of which are matably movable within bores 84. Thus the cylinder portions 98 substantially define a right circular cylinder having a diameter substantially equal to that of the rollers 34 and terminate at their lower extremities in a substantially spherically contoured surface whereby the shape of the cylinder portions 98 substantially correspond to the shape of the rollers 34. The cylinder portions 98 terminate short of the end of ring portion 97 by an amount at least sufficient to permit the formation of the flat ring portion 36a into a U-shaped section such as ring portion 36b.

The male die assembly 94 has a cylindrical outer surface 104 which is matably, slidably located within a like-shaped recess 106 in pressure pad 108. The pressure pad 108 has a flat lower surface 110 which functions to engage a blank such as blank 32a and to hold the blank against the upper surface 74 of the female die assembly 72 prior to engagement of the blank by male die 96. The pad 108 is movable telescopically relative to the male die assembly 94 and has an annular opening 112 extending through its lower surface 110 and into communication with the bore 106. The opening 112 is of a contour similar to that of the die 96 and permits the die 96 to move axially therethrough. The movement of the pad 108 downwardly away from the male die assembly 94 is limited by studs such as studs 114 and 116. Stud 114 extends through a bore 118 and has one end connected to a center portion 120 of the pressure pad 108. The stud 114 has an enlarged head 122 located in and engageable with the lower extremity of a counterbore 124 at the upper end of bore 118 and thereby limits the relative downward movement of pad 108. The stud 116 operates similarly and is connected to pad 108 via flange portion 126 and extends through a bore 128 in the flange portion 130 of die assembly 94 and has an enlarged head 132 located in an enlarged bore 134 in press member 92 which communicates coaxially with bore 128.

The pressure pad 108 is urged downwardly to its lowermost position by coil springs 136 and 138 which are normally under a compressive preload. Spring 136 is located about stud 114 and has one end seated within a counterbore 140 at the lower end of bore 118 and its opposite end bearing against the center portion 120 of pad 108. Spring 138 is located about the stud 116 and has one end seated in the counterbore 142 at the lower end of bore 128 and its opposite end bearing against the flange portion 126 of pad 108. In its lowermost position the lower surface 110 of pad 108 engages the blank before the male die 96.

In operation the blank, such as blank 32a, FIGURE 7, is placed upon the upper surface 74 of female die assembly 72 with the ring portion 36a located centrally relative to and in line with the cavity 80. The leg portions 38a and 40a are located on opposite sides of the bores 84. As the press member 92 moves downwardly the pressure pad engages the blank 32a holding it firmly in the proper position. As the press member 92 descends farther, the springs 136, 138 are compressed and male die 96 is moved through opening 112 and into engagement with the blank 32a. Adjacent outer legs 38a are spaced from each other and adjacent inner legs 40a are spaced from each other a distance such that when they assume an axially extending position the confronting edge surfaces of legs 38a and of legs 40a provide an interference with a right circular cylinder having a diameter equal to the diameter of rollers 34 and located within the pocket defined by associated pairs of legs 38a and 40a. Therefore, an interference of these confronting surfaces likewise exists with the cylindrical portions 98 of the male die 96. Thus as the male die 96 forces the blank 32a into the female cavity 80, the legs 38a and 40a are moved to an axially extending position, and because of the interference, are swaged to the contour of the cylindrical portion 98 (including spherical portion 99) of the male die 96 (see FIGURE 11). Note that the ring portion 36a of blank 32a is wider than the radial width of the ring portion 81 of cavity 80, and hence is deformed to provide a radial, U-shaped cross-section; this cross-section adds rigidity and strength to the bearing cage.

After completion of this forming operation, the press member 92 and hence the assembly 94, is moved upwardly with the compression of the springs 136, 138 maintaining the pressure pad 108 against the upper surface 74 of the female die assembly 72. As the male die 96 moves out of female die cavity 80 and through aperture 112, the formed blank, if adhering to the male die 96, engages the lower surface 110 of pad 108 and hence is striped off the male die 96. Finally the press member 92 and hence the entire upper die assembly 90 are removed from the lower die assembly 72. The formed blank is ejected from the cavity by a plurality of ejector rods, such as rod 142 which engage the blank via bores, such as bore 144, which communicate between the female die cavity 80 and the bore 64 and the base member 62. An ejector member 146 has a stepped construction with a body portion 148 movable matably within counterbore 78 and with a flange portion 150 movable matably within bore 64. The ejector rods, such as rod 142, are engageable with the flange portion 150. A spring 152 has one end seated within a cavity 154 in member 146 and its opposite end engaging the cap 70 and is under a compressive preload and urges the ejector member 146 upwardly to effectuate ejection of the formed blank.

The blank ejected from the die 60 is in the form of formed blank 32b with legs 38b and 40b having edge surfaces, having the contours previously described.

In the next step, the rollers 34 are located within the pockets 42b defined by adjacent ones of leg portions 38b and 40b and the end portions 52b of outer legs 38b are bent radially inwardly with the opposite edge surfaces 54b on each of the end portions 52b engaging the ends of adjacent ones of the rollers 34. A substantially spherical contour is formed on the edge surfaces 54b of end portions 52b as they are swaged against the rollers 34 and the retainer and roller bearing assembly 30 of FIGURES 1 through 6 is formed. Note that the outer end portions 52b are bent along the groove 56b which groove accurately determines the length of the portion to be bent inwardly and facilitates the bending of the end portion 52b whereby the main leg portion 48b is not bowed radially outwardly away from the rollers 34. Thus the surfaces engaging the rollers 34 are of a contour substantially corresponding to the contour of the surface of the rollers which are engaged by those portions and hence provide for good bearing surfaces and prevent point or line contact. The retainer and bearing assembly 32 can then be located within inner and outer races such as inner and outer races 22 and 24, respectively.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. The method of making a bearing retainer for a plurality of rollers from a flat blank comprising the steps of: forming the flat blank into a flat blank member comprising a flat annular ring portion having a plurality of circumferentially spaced, radially outwardly extending outer leg portions and a similar plurality of circumferentially spaced, radially inwardly extending, inner leg portions each located in radial alignment with one of the outer leg portions, and deforming the flat blank member moving the outer and inner leg portions to axially extending positions whereby confronting surfaces on adjacent leg portions define a plurality of circumferentially disposed pockets each for receiving a roller member and simultaneously forming mating portions on the confronting surfaces for receiving the rollers to have a radially extending curved contour similar to that defined by the radius of the rollers.

2. The method of claim 1 for making a bearing retainer and further for making a roller assembly including a plurality of rollers and a retainer further comprising the steps of: forming on the flat blank member a circumferentially extending groove in each of one of the pluralities of inner and outer leg portions thereby forming each of the corresponding leg portions to have a main leg portion and an end leg portion, locating the rollers in the plurality of pockets, and bending the end leg portion radially at the groove towards the associated rollers to thereby axially retain the rollers within the pockets.

3. The method of claim 1 for making a bearing retainer and further for making a roller assembly including a plurality of rollers and a retainer with each of the roller members defining a spherical contour at its ends, said method further comprising the steps of: forming on the flat blank member a circumferentially extending groove in each of one of the pluralities of inner and outer leg portions thereby forming each of the corresponding leg portions to have a main leg portion and an end leg portion, simultaneously with the formation of the cylindrical contour on said mating portions forming the axially inner portion of the confronting surfaces to have a spherical contour for matably receiving the corresponding end of that one of the rollers, locating the rollers in the plurality of pockets, and bending the end leg portions radially at the groove towards the associated rollers and swaging the end leg portions against the corresponding ends of the rollers to form a similar spherical contour therein and to thereby axially retain the rollers within the pockets.

4. The method of making a roller assembly including a plurality of rollers and a retainer further comprising the steps of: forming a flat blank into a blank member comprising an annular ring portion having a plurality of circumferentially spaced, radially extending leg portions and deforming the blank member moving the leg portions to axially extending positions whereby confronting surfaces on adjacent leg portions define a plurality of circumferentially disposed pockets each for receiving a roller member and forming engaging portions on the confronting surfaces for engaging and receiving the rollers, forming in each leg portion an abrupt and substantial change in cross-section relative to the section of said leg portions preceding it thereby forming each of the leg portions to have a main leg portion and an outer leg portion, locating the rollers in the plurality of pockets, and bending the end leg portions generally at the location of the abrupt and substantial change radially towards the associated rollers to thereby axially retain the rollers in the pockets.

5. The method of claim 4 in which said abrupt and substantial change is a circumferentially extending groove.

6. The method of claim 4 with said blank member being formed to have radially inner and radially outer leg portions with engaging portions being formed on confronting surfaces on both the radially inner and outer legs.

7. The method of claim 6 with said abrupt and substantial change being formed in the radially outer leg portions.

References Cited

UNITED STATES PATENTS

| 661,769 | 11/1900 | Perkins | 308—217 |
| 2,082,390 | 6/1937 | Gibbons | 308—214 |

FOREIGN PATENTS

| 726,560 | 10/1942 | Germany. |

THOMAS H. EAGER, *Primary Examiner.*